United States Patent
Padmanabhan

(10) Patent No.: US 10,585,657 B2
(45) Date of Patent: Mar. 10, 2020

(54) SETUP, MANAGEMENT, AND PACKAGING OF APPLICATIONS ACCESSING CENTRALIZED AND DECENTRALIZED DATA

(71) Applicant: salesforce.com, inc., San Francisco, CA (US)

(72) Inventor: Prithvi Krishnan Padmanabhan, San Ramon, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/940,646

(22) Filed: Mar. 29, 2018

(65) Prior Publication Data

US 2019/0303121 A1    Oct. 3, 2019

(51) Int. Cl.
*G06F 9/445* (2018.01)
*G06F 8/61* (2018.01)
*H04L 9/06* (2006.01)
*H04L 29/08* (2006.01)
*G06F 16/27* (2019.01)

(52) U.S. Cl.
CPC ............ *G06F 8/61* (2013.01); *G06F 9/44505* (2013.01); *G06F 16/27* (2019.01); *H04L 9/0637* (2013.01); *H04L 67/306* (2013.01); *H04L 2209/38* (2013.01)

(58) Field of Classification Search
CPC .......... G06F 8/71; G06F 9/44505; G06F 8/20; G06F 8/61; G06F 8/36
USPC ........................................ 717/168
See application file for complete search history.

(56) References Cited

U.S. PATENT DOCUMENTS

2019/0109713 A1* 4/2019 Clark .................... H04L 9/3226

* cited by examiner

*Primary Examiner* — Chuck O Kendall
(74) *Attorney, Agent, or Firm* — Sterne, Kessler, Goldstein & Fox P.L.L.C.

(57) ABSTRACT

Disclosed herein are system, method, and computer program product embodiments for an application set-up and management system (AMS). An embodiment operates by receiving a selection of an application for installation. The application accesses a plurality of data fields during its execution, including both a first set of one or more of the data fields that are managed on a centralized database, and a second set of one or more of the data fields that are managed on a decentralized ledger during its operation. The application is installed on a cloud platform of a first user account, wherein the cloud platform includes access to the centralized database. Information associated with setting up the decentralized ledger corresponding to the application is received, and the decentralized ledger is set up. The application is activated on the cloud platform.

19 Claims, 4 Drawing Sheets

SETUP, MANAGEMENT, AND PACKAGING OF APPLICATIONS ACCESSING CENTRALIZED AND DECENTRALIZED DATA

CROSS REFERENCE TO RELATED APPLICATIONS

This application is related to co-pending U.S. patent application Ser. No. 15/940,665, by Padmanabhan, "Hybrid Cloud Chain Management of Centralized and Decentralized Data," filed herewith; and is also related to co-pending U.S. patent application Ser. No. 15/885,811, by Padmanabhan, "Systems, Methods, and Apparatuses for Implementing Document Interface and Collaboration Using Quipchain In a Cloud Based Computing Environment," filed Jan. 31, 2018, and U.S. patent application Ser. No. 15/885,803, by Padmanabhan, "Systems, Methods, and Apparatuses for Implementing Intelligent Consensus, Smart Consensus, Weighted Consensus Models for Distributed Ledger Technologies in a Cloud Based Computing Environment," filed Jan. 31, 2018, U.S. patent application Ser. No. 14/932,100, by Padmanabhan, "Systems, Methods, and Apparatuses for Implementing Super Community And Community Sidechains with Consent Management for Distributed Ledger Technologies in a Cloud Based Computing Environment" filed Jan. 31, 2018, U.S. patent application Ser. No. 15/932,099, by Padmanabhan, "Systems, Methods, and Apparatuses for Implementing a Virtual Chain Model for Distributed Ledger Technologies in a Cloud Based Computing Environment" filed Jan. 31, 2018, and U.S. patent application Ser. No. 15/932,092, by Padmanabhan, "Systems, Methods, and Apparatuses for Implementing Smart Flow Contracts Using Distributed Ledger Technologies in a Cloud Based Computing Environment" filed Jan. 31, 2018; all of which are hereby incorporated by reference in their entireties.

BACKGROUND

With the rise of blockchain technology as a data management system, data may be managed in either a centralized manner on a traditional database, or in distributed or decentralized manner across a blockchain network of computers. However, configuring applications that may need access to the data becomes a problematic and resource intensive task as each data management system has its own processes for how it is to be set up and how the data may be accessed and modified.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the set-up and management of an application accessing centralized and decentralized data.

Figure 1:
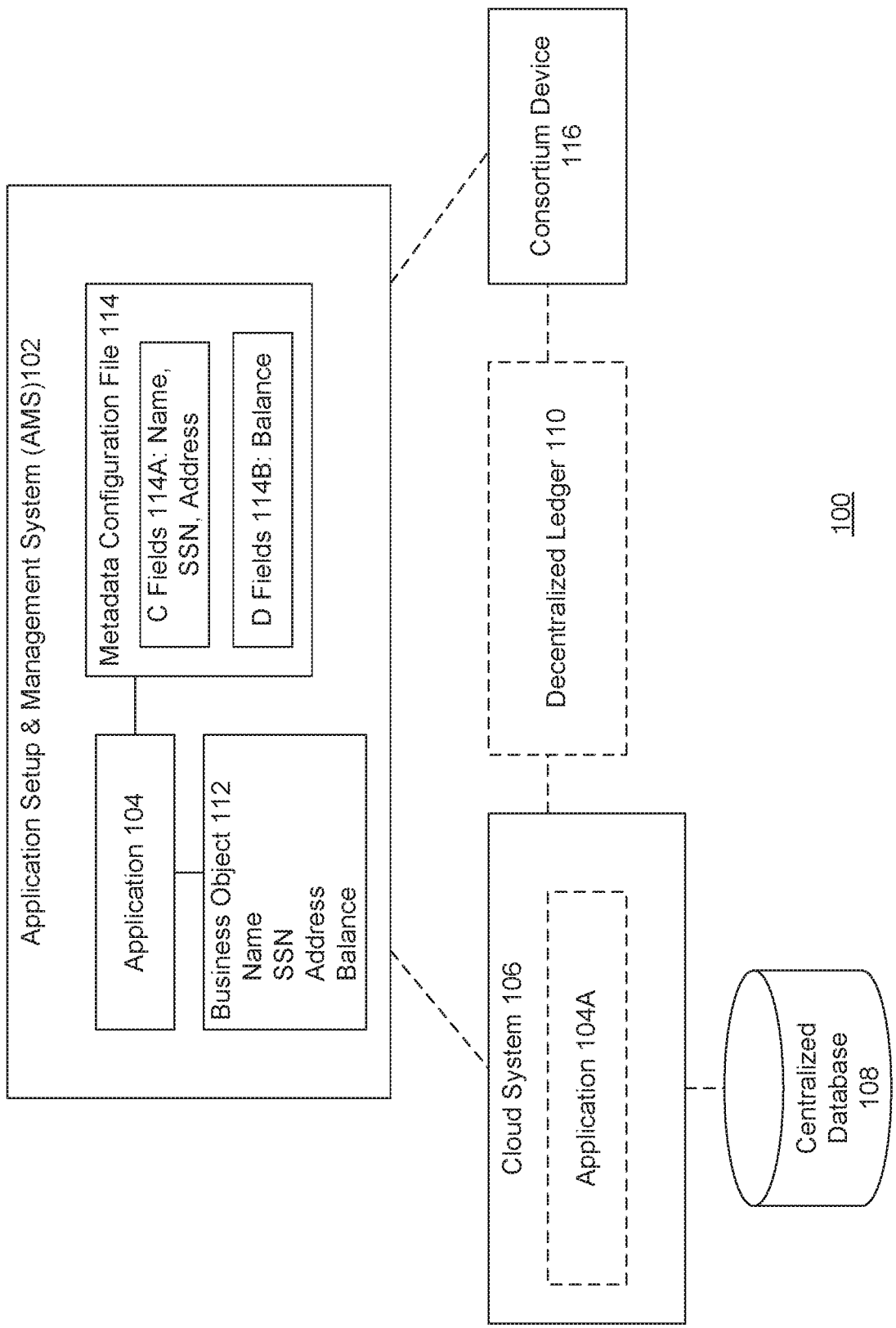
FIG. 1 is a block diagram illustrating an application set-up and management system (AMS), according to some embodiments.

FIG. 1 is a block diagram 100 illustrating an application set-up and management system (AMS) 102, according to some embodiments. AMS 102 may provide functional support related to downloading and setting up an application 104. Application 104A may refer to application 104 as it is set up or otherwise configured to operate on or be executable by one or more computing devices of a cloud system 106. As used herein, application 104 and application 104A may be used interchangeably.

Application 104 may require access to both centralized data (e.g., from a centralized database 108) and decentralized data (e.g., from a decentralized ledger 110) during its operation or execution. Centralized database 108 may include data stored in a traditional database structure or format, in which various devices (of cloud 106) may synchronize changes with one or more servers that host a central or master copy of data. Decentralized ledger 110, by contrast, may include data that is cooperatively stored across multiple computing devices, each of which may participate in managing the data. For example, each computing device participating in the decentralized network may include its own master copy of the data, which may periodically or continuously be reconciled with the other master copies.

Application 104 may make use of both centralized (108) and decentralized (110) data storage and management mechanisms to store and from which to access data during its operation. AMS 102 may provide set-up, installation, or other configuration functionality of centralized database 108 and/or decentralized ledger 110 for use by application 104.

Application 104 may refer to a program, app, or application (including web application) that is configured to access both centralized data and decentralized during its operation. In different embodiments, application 104 may provide various different types of functionality including, but not limited to, financial asset tracking, record keeping, and fraud detection. In an embodiment, AMS 102 may provide a platform, exchange, or marketplace that enables user devices or user accounts to access or download application 104 onto local devices for set-up and operation across one or more devices of a network. For example, AMS 102 may receive a request to download and configure application 104 for use on cloud system 106.

Cloud system 106 may enable simultaneous access to a shared pool of system resources, including data, by various member devices of the cloud or network. For example, data may be stored on a centralized database 108, but may be accessible to however many devices that may be members of the cloud 106 or to a limited number of cloud network enabled devices or accounts that have authorized access to the data of database 108. Application 104A may include application 104 as it has been configured for use by multiple member devices of cloud 106.

As part of its operation on the devices of cloud 106, application 104A may require access to both centralized and decentralized data. As part of the download and set up procedure, AMS 102 may configure application 104A, centralized database 108, and decentralized ledger 110, according to the specifications of application 104.

Application 104 may include a metadata configuration file 114 that indicates the specifications and requirements for the set up and execution of application 104A on a cloud computing system 106. Metadata configuration file 114 may include an indication as to how the various data fields which may be accessed by application 104 during its execution are to be managed (e.g., in a centralized or decentralized manner).

In an embodiment, metadata configuration file 114 may be generated during development of application 104 by an application developer within a development environment. For example, during development of application 104, when a developer includes a field (such as name) in a business object 112, the developer may be prompted to provide an indication as to whether the field is managed by a centralized database 108 or is accessible via a decentralized ledger 110. The developer may further indicate on which particular database 108 or ledger 110, the data is being managed (if multiple databases 108 and/or ledgers 110 are being accessed by application 104).

In an embodiment, during the development of application 104, a development environment may use the metadata configuration file 114 to enable the developer to test (execute, compile, run) the code of application 104 as it is being developed. In an embodiment, the development environment may detect when a new field or variable is being added to the code of application 104, and if the field or variable is not detected in metadata configuration file 114, then the developer may be prompted to confirm or indicate how the field data is being managed. After development has completed, the metadata configuration file 114 may be packaged or otherwise provided with application 104 during an upload to or a listing of application 104 on AMS 102. AMS 102 may then make application 104 available for download by various computing devices.

In an embodiment, the metadata configuration file 114, or another file provided with application 104 may include information for setting up centralized and decentralized data accesses described herein. In an embodiment, when an application 104 is downloaded by a particular device of cloud system 106, metadata configuration file 114 including this set up information, may also be made available for download. For example, on a particular download of an application 104, one or more devices of cloud system 106 may automatically be designated as blockchain nodes that support decentralized ledger 110. Such a designation may include configuring or assigning the device(s) with public and private key information which may be necessary to access or update decentralized ledger 110. In an embodiment, a similar setup procedure may be performed for or otherwise made available to add other tenants or devices (which may be part of different cloud computing systems 106) that have downloaded the package or application 104 and are part of the permissioned ledger 110 to be added to the same blockchain network.

In an embodiment, application 104 may arrange or organize data as business objects 112. A business object 112 may include a grouping, collection, or container of fields, rows, columns, or other data values that are related to a particular concept or idea. Example business objects 112 may include customers, employees, accounts, branches, partners, vehicles, products, and suppliers.

Each data or business object 112 may include various fields of data or information relevant to the particular data or business object. For example, a customer business object (as shown in FIG. 1) may include the data fields: Name, SSN (social security number), address, and balance. In other embodiments, the customer business object may include different or varying fields, such as phone number, how long they have been a customer, family information, medical information, nationality, residency, order history, payment history, etc.

In the example of FIG. 1, a customer record or object may include name, SSN, address, and account balance information. However the various fields of information of the customer record may be managed across one or more centralized databases 108 and one or more decentralized ledgers 110.

In an embodiment, metadata configuration file 114 may indicate how the various fields of information of a particular business object 112 are managed. For example, as shown, metadata configuration file 114 may indicate that name, SSN, and address are C fields 114A (corresponding to centralized data fields), and balance is a D field 114B (corresponding to a decentralized field). Rather than requiring a user to set up the data management processes for the various fields across the different defined business objects 112 of application 104 on their own, AMS 102 may configure one or more centralized databases 108 and one or more decentralized ledgers 110 according to the specifications of metadata configuration file 114 as part of the download and set-up process.

In an embodiment, centralized database 108 may include a system of one or computing devices or servers that manage data in a row-wise or column-wise database format. Centralized database 108 may include a master repository of data which may be accessed or changed by various computing devices which have access to centralized database 108. For example, an enterprise server may host a master set of data that is accessed and modified by a number of computing devices. Then, for example, the computing devices may either synchronously or asynchronously perform updates to the master data set. The updates may then be provided or otherwise made available, by centralized database 108 (which may be operating across multiple different servers), to the various computing devices of cloud 106 that are accessing or modifying the data on an ongoing basis.

In an embodiment, centralized database 108 may include a conflict resolution mechanism that resolves any conflicts that may occur when two or more devices try and modify the same data. In an embodiment, centralized database 108 may be a multi-versioning database, which includes multiple timestamped versions of data that are being accessed by various ongoing transactions.

Decentralized ledger 110 may be a system of multiple computing devices arranged in a peer-to-peer network that together maintain a list or tracking of transactions, records, or other information between the users, accounts, systems, or devices that are part of the decentralized ledger 110 network. An example decentralized ledger 110 may include a blockchain. In a blockchain, the ledger of transactions 110 may be maintained as a growing list of records, referred to as blocks. In an embodiment, each block may include a hash pointer to a previous block, a timestamp, and transactional data. In an embodiment, a block may include a signature or indication of a user account (associated with a particular private key) that entered the block information. The various new blocks may be appended to the ledger 110. This growing list of blocks and pointers may be the chain of blocks referred to as the blockchain. As used herein, the terms blockchain and decentralized ledger 110 may be used interchangeably.

In an embodiment, once data of a transaction is recorded on decentralized ledger 110, the data cannot be altered afterwards without altering all of the subsequent blocks, without a collusion of a majority of the network, which helps to prevent fraud. In an embodiment, decentralized ledger 110 may be used to store various types of data including, but not limited to, event data, transaction data occurring between parties (particularly that are members of the blockchain), and medical records. Decentralized ledger 110 may also be used to manage or track digital currencies, such as bitcoin.

In an embodiment, the data of decentralized ledger 110 may be distributed multiple times across the network of machines or systems participating in the decentralized ledger 110. The information stored on or across the participating nodes may continually or periodically be reconciled. For example, a proposed change may occur on one node, but only when the change is accepted or reconciled by all (or at least a majority) of the participating devices of the blockchain, the data may be deemed updated and may become part of the ledger 110. Unlike centralized database 108, the data of decentralized ledger 110 is not stored in any single location, but instead is decentralized, distributed, or shared amongst the member devices or nodes of the chain or information network.

For example, identical blocks of data may be stored across all or a subset of the network of computers maintaining decentralized ledger 110. This may enable multiple parties or devices to have access to the same data at the same time and prevent data manipulation. Further, because the data is not under the control of any one single entity, the decentralized network (ledger 110) does not have any single point of failure. If any of the devices of the decentralized network crashes or otherwise becomes unavailable, then decentralized ledger 110 may still be accessible and updated by the remaining devices.

In an embodiment, every node or device (or a designated number of nodes or devices) involved in maintaining decentralized ledger 110 may function as an administrator of all or a portion of the data of decentralized ledger 110. This may be different from centralized database 108 in which all the nodes that are updating the data must synchronize the updates with a master copy of the data. Additional differences and distinctions between a centralized database 108 and a decentralized database or decentralized ledger 110 are discussed below in reference to FIG. 3.

In an embodiment, AMS 102 may receive a request from a user account or user device associated with cloud system 106 to download application 104. Rather than requiring the user account requesting the download to set up a decentralized ledger by themselves, AMS 102 may be configured to handle the set-up of decentralized ledger 110 on behalf of the downloading user account, user, user device, or cloud system 106. As part of the set-up process, AMS 102 may set up the decentralized network (for decentralized ledger 110) according to metadata configuration file 114 which may indicate node management and tenant configuration, tenant management, cert management, and other management functionality.

In an embodiment, as part of the download, installation, set-up, and configuration process of application 104, AMS 102 may request information (from one or more users or devices of cloud system 106) necessary to set up a decentralized ledger 110 for access by application 104A. The necessary information may vary in different embodiments, but may include the identification at least one additional user, user account, cloud system, or device (hereinafter referred to as consortium device 116) that will be participating in the management and maintenance of decentralized ledger 110. In an embodiment, multiple different devices of cloud system 106 may be configured by AMS 102 to participate as a member of the decentralized network managing decentralized ledger 110.

Consortium device 116 may include one or more devices which may be part of the same or different network (e.g., cloud network 106) as the requesting or downloading device or user account. Upon receiving the identification of at least one other device participating in the decentralized network (which may occur after an initial set up and execution of application 104A on cloud system 106), ADS 102 may send a request or invitation to consortium device 116 to join the decentralized network responsible for maintaining decentralized ledger 110. In an embodiment, the request may be sent to a particular e-mail address associated with a user account of consortium device 116.

AMS 102 may configure application 104A on cloud system 106 as well as application 104A on various other cloud systems or devices as part of consortium device 116 joining the decentralized network. The decentralized network may include one or more devices of cloud system 106 and one or more other consortium devices 116 across different networks which are responsible for maintaining or that may request updates to decentralized ledger 110.

As part of the set up process, AMS 102 may configure distributed ledger 110 to maintain the D fields 114B indicated by metadata configuration file 114. For example, distributed ledger 110 may track the balance field across multiple user accounts or records. In an embodiment, AMS 102 may configure multiple different decentralized networks with different decentralized ledgers 110 maintained by different parties as part of the set-up process.

AMS 102 may configure application 104A to access to distributed ledger 110, which may include setting up or registering user identifiers, passwords, and public and private key information. In an embodiment, this configuration by AMS 102 may be performed on both application 104A as installed on user cloud system 106 and a copy of application 104 which may be downloaded an installed on consortium device 116 or other network.

In an embodiment, AMS 102 may also set up a local centralized database 108 on or accessible by user cloud system 106 for use by application 104A. As indicated above, application 104 may access C fields 114A that may require traditional or centralized database 108 accesses. In an embodiment, setting up centralized database 108 may include requesting that a new table, field, or columns be added to an existing centralized database of cloud system 106. AMS 102 may perform this configuration on or across whatever networks or for whatever devices that may have downloaded application 104 and are participating in the decentralized network. Once application 104A is configured to access both centralized database 108 and decentralized ledger 110, application 104A may be executed and used by one or more devices on user cloud system 106.

In an embodiment, additional parties (i.e., consortium user devices 116) may join the decentralized network responsible for maintaining decentralized ledger 110 after the initial set up of application 104A has been completed. AMS 102 may enable and configure these later-joining consortium user devices 116 to join the decentralized network.

In an embodiment, application 104 may be a fraud detection application that is to be used by four customers: A, B, C, and D. As part of the fraud detection, the customers A, B, and C may want to share data across the decentralized ledger 110. As such, AMS 102 may configure application 104A so that customers A, B, and C are able to share data and manage decentralized ledger 110 according to the metadata configuration file 114, while customer D receives an installation of application 104 without access to decentralized ledger 110. In an embodiment, AMS 102 may later configure decentralized ledger 110 to enable access by customer D if the decentralized network or blockchain management requirements are satisfied.

Figure 2:
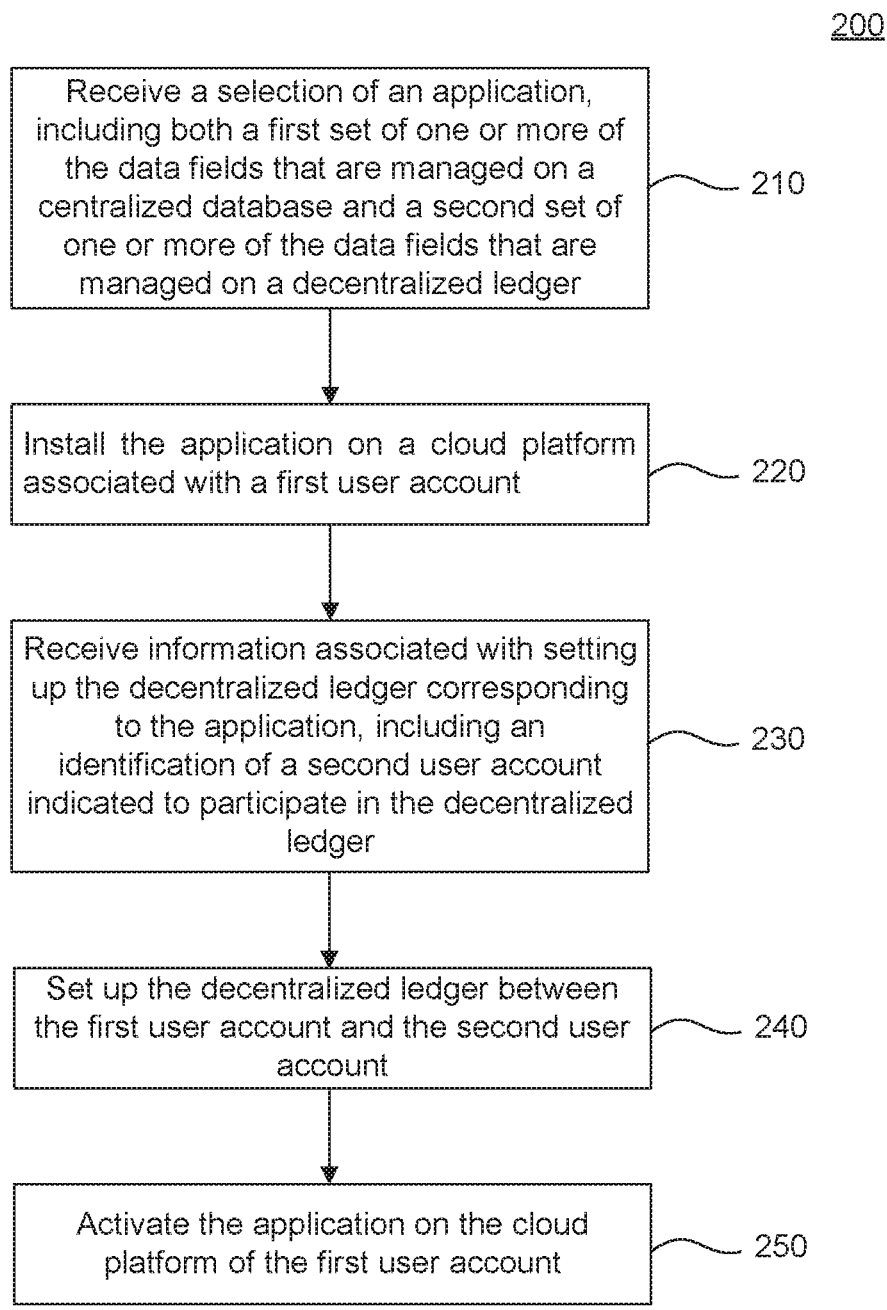
FIG. 2 is a flowchart illustrating example operations of an AMS, according to some embodiments.

FIG. 2 a flowchart 200 illustrating example operations of an application set-up and management system (AMS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a selection of an application is received. For example, AMS 102 may receive a selection of application 104 from a device of cloud system 106. The selection may be a selection of the application from a list of applications for installation from a user interface. The selection may indicate a request to install, download, or otherwise configure application 104 for operation on cloud system 106 which may then provide access to application 104A to multiple devices of the system 106.

Application 104 may include both a first set of one or more of the data fields that are managed on a centralized database (C Fields 114A), and a second set of one or more of the data fields that are managed on a decentralized ledger (D Fields 114B). AMS 102 may determine a metadata configuration file 114 that indicates that application requires access to both centralized data fields 114A and decentralized data fields 114B, and may proceed with setting up application 104 accordingly.

In 220, the application is installed on a cloud platform associated with a first user account, wherein the cloud platform includes access to the centralized database. For example, AMS 102 may make application 104 available for download and as part of the set up process enable a user to set up a user account for accessing application 104A. In an embodiment, AMS 102 may set up or otherwise configure an existing centralized database 108 of cloud 106 with C fields 114A as indicated by the metadata configuration file 114 of application 104. In an embodiment, one or more devices of cloud system 106 may have authorization or access to centralized database 108 via cloud system 106. For example, centralized database 108 may be communicatively coupled to one or more devices (such as servers) of cloud system 106.

In 230, information associated with setting up the decentralized ledger corresponding to the application is received. The information may include an identification of a second user account indicated to participate in the decentralized ledger. For example, during a set-up process of application 104A, AMS 102 may request or receive an identification of another user, user device, user account, or other system which is going to participate in the decentralized network responsible for maintaining decentralized ledger 110.

In 240, the decentralized ledger is set up between the first user account and the second user account. For example, AMS 102 may make application 104 available for download and set for a consortium device 116 (which may include another cloud network 106) which will be participating in managing D fields 114B on decentralized ledger 110. This may be done across multiple consortium devices 116, across multiple networks, for various D fields 114B that may be managed across multiple different decentralized ledgers 110.

In 250, the application is activated on the cloud platform of the first user account. For example, when decentralized ledger 110 is set up for management by one or more of the identified consortium devices 116, application 104A (or that functionality that requires D field 114B access) may be activated or otherwise made available for execution by the devices of cloud system 106.

Figure 3:
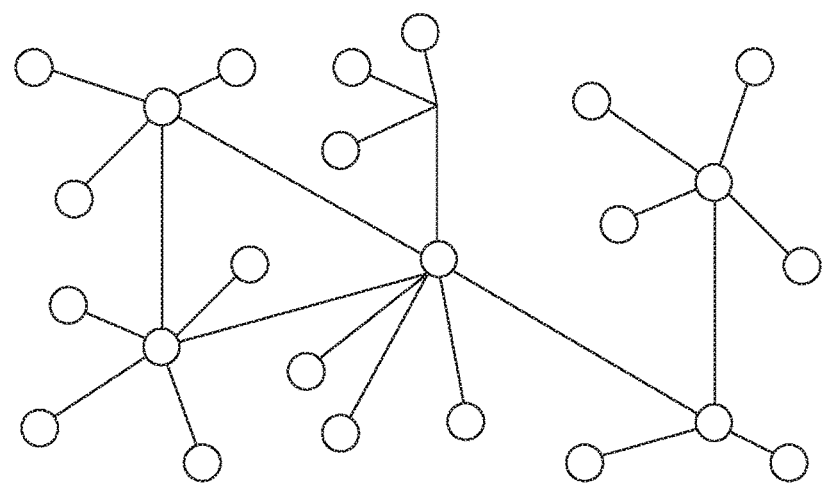
FIG. 3 illustrates differences between a centralized database system and a decentralized database system using a decentralized ledger, according to some embodiments.
Figure 3:
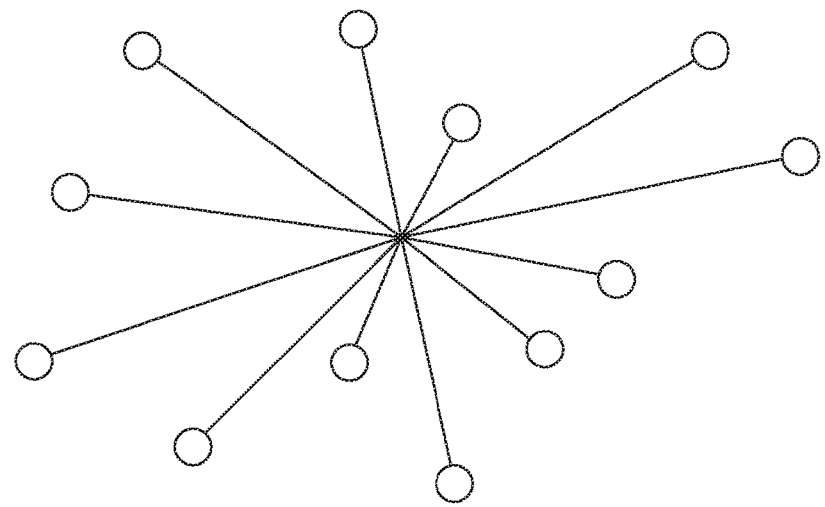

FIG. 3 illustrates differences between a centralized information network 310 and a decentralized information network 320, according to some embodiments.

In the example of FIG. 3, information network 310 may illustrate an example architecture of centralized database 108. As illustrated by information network 310, a central or coordinating point or node may manage the information or data which may be distributed across to accessible to various other nodes. For example, an enterprise database may maintain a master set of data that is being accessed and modified by various other computing devices over mobile phones and laptops.

Decentralized information network 330 may illustrate an example information architecture for the devices participating in or responsible for managing decentralized ledger 110. In contrast to network 310, network 320 does not include a single or centralized point of failure or a master set of data. Instead, for example, each node may include a (full or partial) copy of a ledger and may participate in confirming transactions independently (i.e., without requesting that a core or master set of data is updated). Updates to the ledger may then be reconciled by all of the participating network nodes of network 320.

Figure 4:
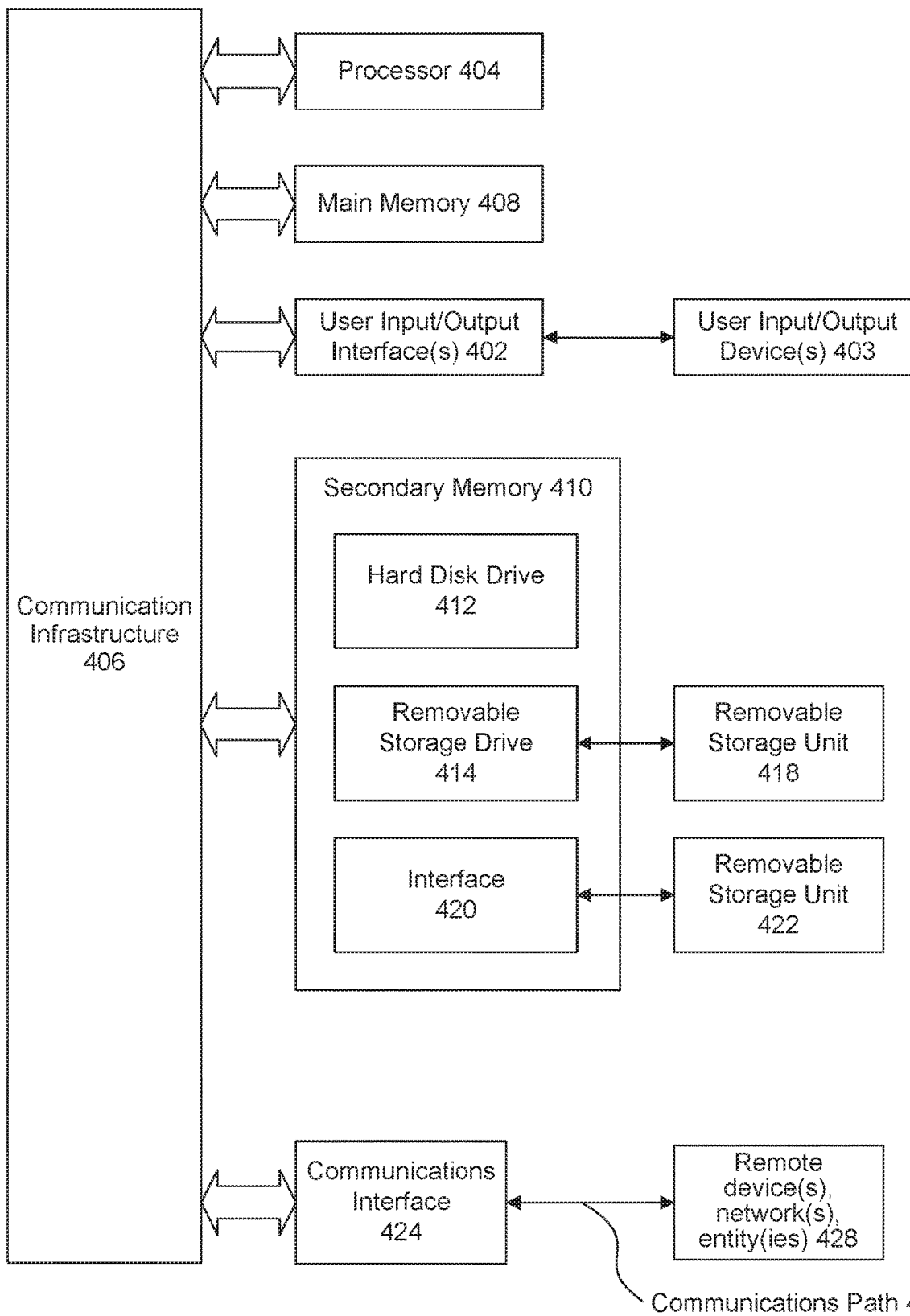
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a selection of an application for installation, wherein the application accesses a plurality of data fields corresponding to one or more objects of the application during its execution, wherein a particular one of the one or more objects includes both a first set of one or more of the data fields that are managed on a centralized database, and a second set of one or more of the data fields that are managed on a decentralized ledger of a blockchain network comprising two or more devices that include the application;
installing the application on a cloud platform of a first user account, wherein the cloud platform includes access to the centralized database;
receiving configuration information for setting up the decentralized ledger corresponding to the application as part of the installing, wherein the configuration information was included with the installed application, and wherein the configuration information includes an identification of a second user account on one of the two or more devices that include the application indicated to participate in the decentralized ledger;
setting up the decentralized ledger between the first user account and the second user account; and
activating the application on the cloud platform of the first user account.

2. The method of claim 1, wherein the receiving information comprises:
determining, from a configuration file associated with the application, which of the data fields are to be managed by the decentralized ledger.

3. The method of claim 2, wherein the receiving information comprises:
requesting, from the first user account, the information about the second user account.

4. The method of claim 2, wherein the installing comprises:
determining the first set of data fields from the metadata configuration file; and
configuring the centralized database based on the first set of data fields indicated by the metadata configuration file.

5. The method of claim 1, wherein the setting up comprises:
setting up a second decentralized ledger between the first user account and a third user account.

6. The method of claim 1, wherein one or more fields of the first set and one or more fields of the second set are managed by the application as part of a business object.

7. A system, comprising:
a memory; and
at least one processor coupled to the memory and configured to:
receive a selection of an application for installation, wherein the application accesses a plurality of data fields corresponding to one or more objects of the application during its execution, wherein a particular one of the one or more objects includes both a first set of one or more of the data fields that are managed on a centralized database, and a second set of one or more of the data fields that are managed on a decentralized ledger of a blockchain network comprising two or more devices that include the application;
install the application on a cloud platform of a first user account, wherein the cloud platform includes access to the centralized database;
receive configuration information for setting up the decentralized ledger corresponding to the application as part of the installing, wherein the configuration information was included with the installed application, and wherein the configuration information includes an identification of a second user account on one of the two or more devices that include the application indicated to participate in the decentralized ledger;
set up the decentralized ledger between the first user account and the second user account; and
activate the application on the cloud platform of the first user account.

8. The system of claim 7, wherein the processor that receives information is configured to:
determine, from a configuration file associated with the application, which of the data fields are to be managed by the decentralized ledger.

9. The system of claim 8, wherein the processor that receives information is configured to:
request, from the first user account, the information about the second user account.

10. The system of claim 8, wherein the processor that installs is configured to:
determine the first set of data fields from the metadata configuration file; and
configure the centralized database based on the first set of data fields indicated by the metadata configuration file.

11. The system of claim 7, wherein the processor that sets up is configured to:
set up a second decentralized ledger between the first user account and a third user account.

12. The system of claim 7, wherein one or more fields of the first set and one or more fields of the second set are managed by the application as part of a business object.

13. A non-transitory computer-readable device having instructions stored thereon that, when executed by at least one computing device, cause the at least one computing device to perform operations comprising:
receiving a selection of an application for installation, wherein the application accesses a plurality of data fields corresponding to one or more objects of the application during its execution, wherein a particular one of the one or more objects includes both a first set of one or more of the data fields that are managed on a centralized database, and a second set of one or more of the data fields that are managed on a decentralized ledger of a blockchain network comprising two or more devices that include the application;
installing the application on a cloud platform of a first user account, wherein the cloud platform includes access to the centralized database;

receiving configuration information for setting up the decentralized ledger corresponding to the application as part of the installing, wherein the configuration information was included with the installed application, and wherein the configuration information includes an identification of a second user account on one of the two or more devices that include the application indicated to participate in the decentralized ledger;

setting up the decentralized ledger between the first user account and the second user account; and activating the application on the cloud platform of the first user account.

14. The non-transitory computer-readable device of claim 13, wherein the receiving information comprises:
determining, from a configuration file associated with the application, which of the data fields are to be managed by the decentralized ledger.

15. The non-transitory computer-readable device of claim 14, wherein the receiving information comprises:
requesting, from the first user account, the information about the second user account.

16. The non-transitory computer-readable device of claim 14, wherein the installing comprises:
determining the first set of data fields from the metadata configuration file; and
configuring the centralized database based on the first set of data fields indicated by the metadata configuration file.

17. The non-transitory computer-readable device of claim 13, wherein the setting up comprises:
setting up a second decentralized ledger between the first user account and a third user account.

18. The non-transitory computer-readable device of claim 13, wherein the decentralized ledger comprises a list a list of transactions between a plurality of accounts of a peer-to-peer network, wherein each entry into the list includes both a timestamp and an indication of an account associated with the entry.

19. The method of claim 1, wherein the decentralized ledger is shared amongst the two or more devices of the blockchain network that include the application.

* * * * *